April 17, 1951
W. E. CONLEY, JR
2,549,575
APPARATUS FOR THE CONTINUOUS TREATMENT OF
LIQUIFORM COMESTIBLES
Filed June 12, 1947
5 Sheets-Sheet 2
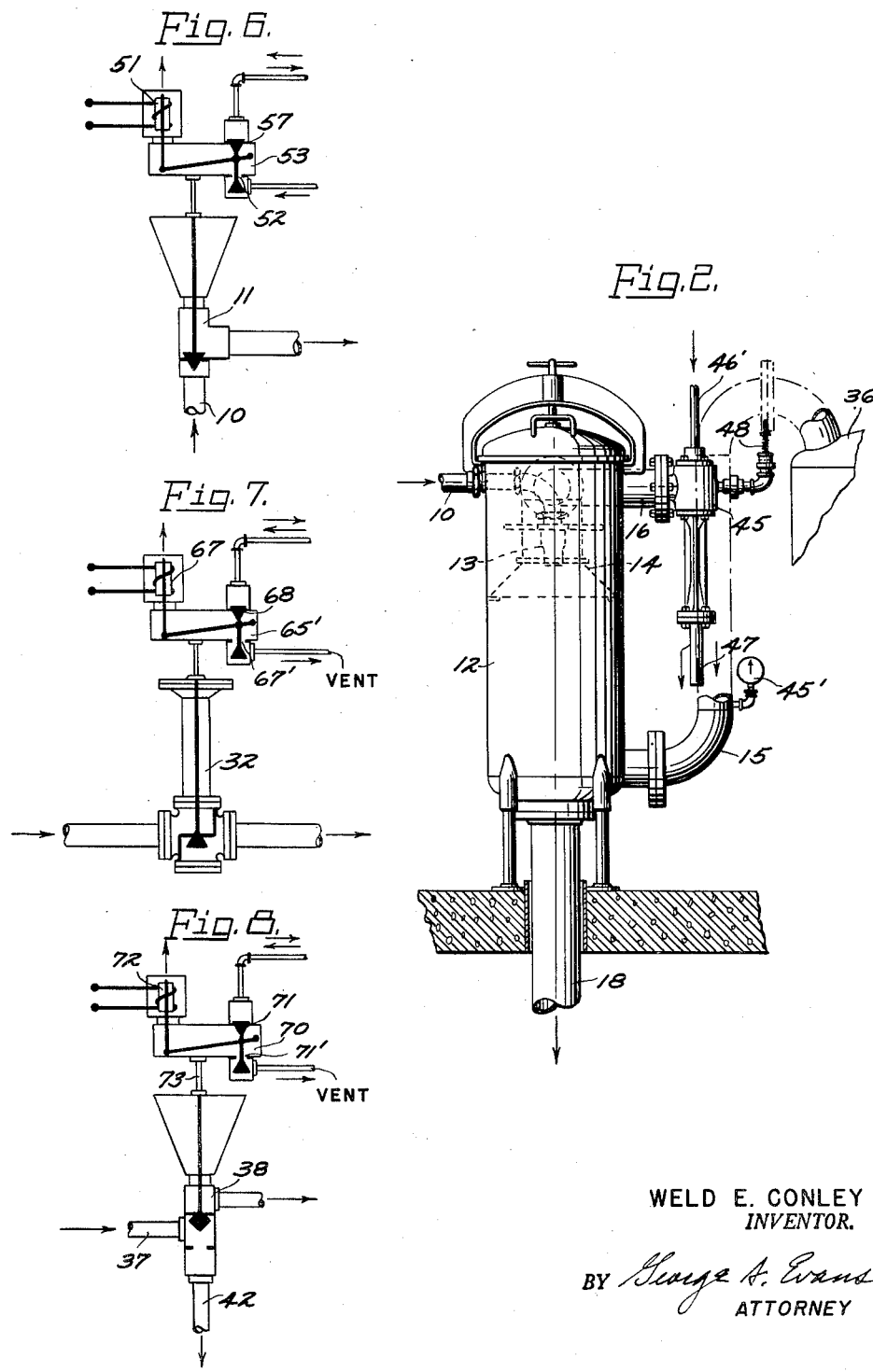
WELD E. CONLEY JR.
*INVENTOR.*
BY George A. Evans
*ATTORNEY*

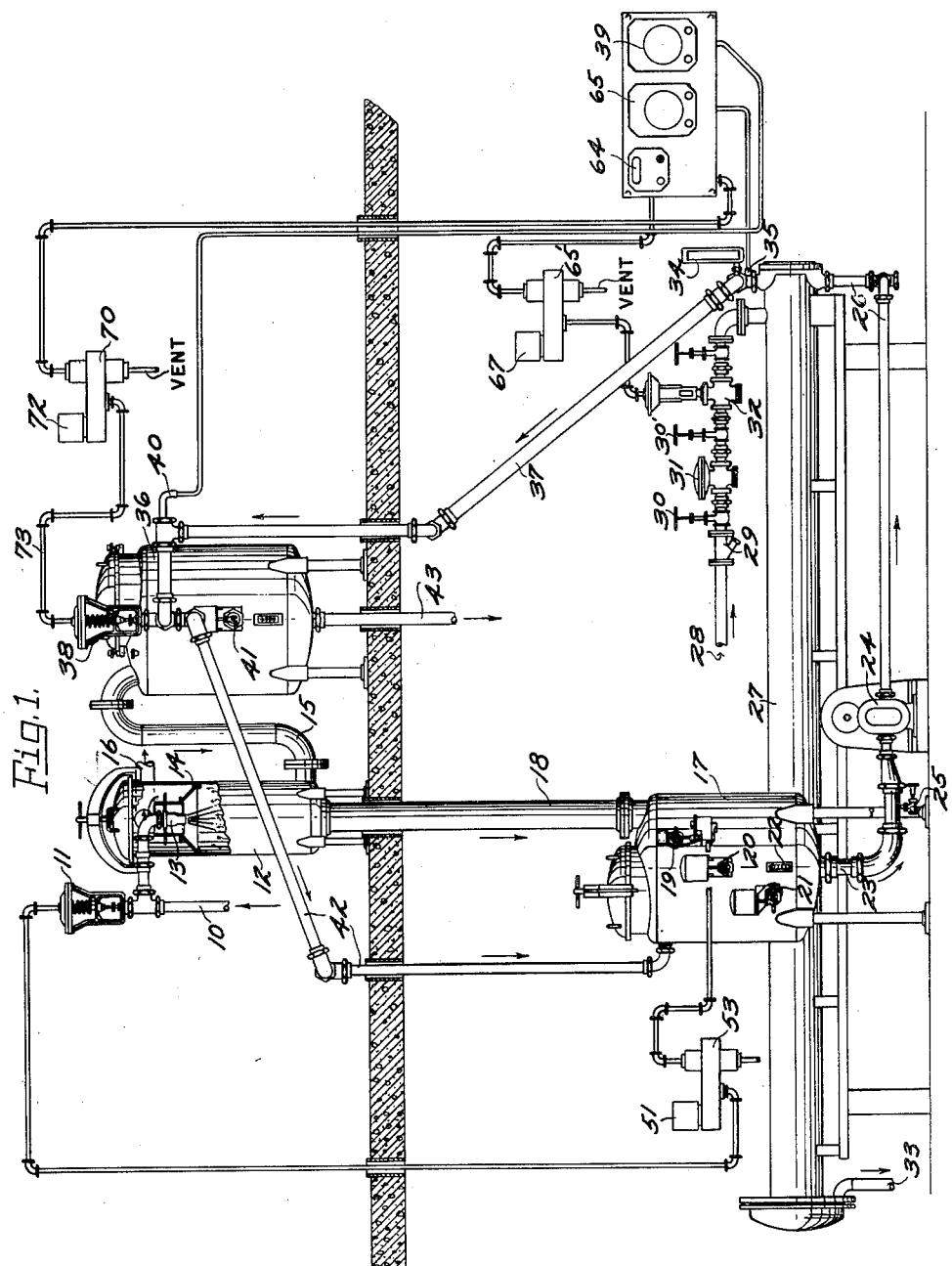

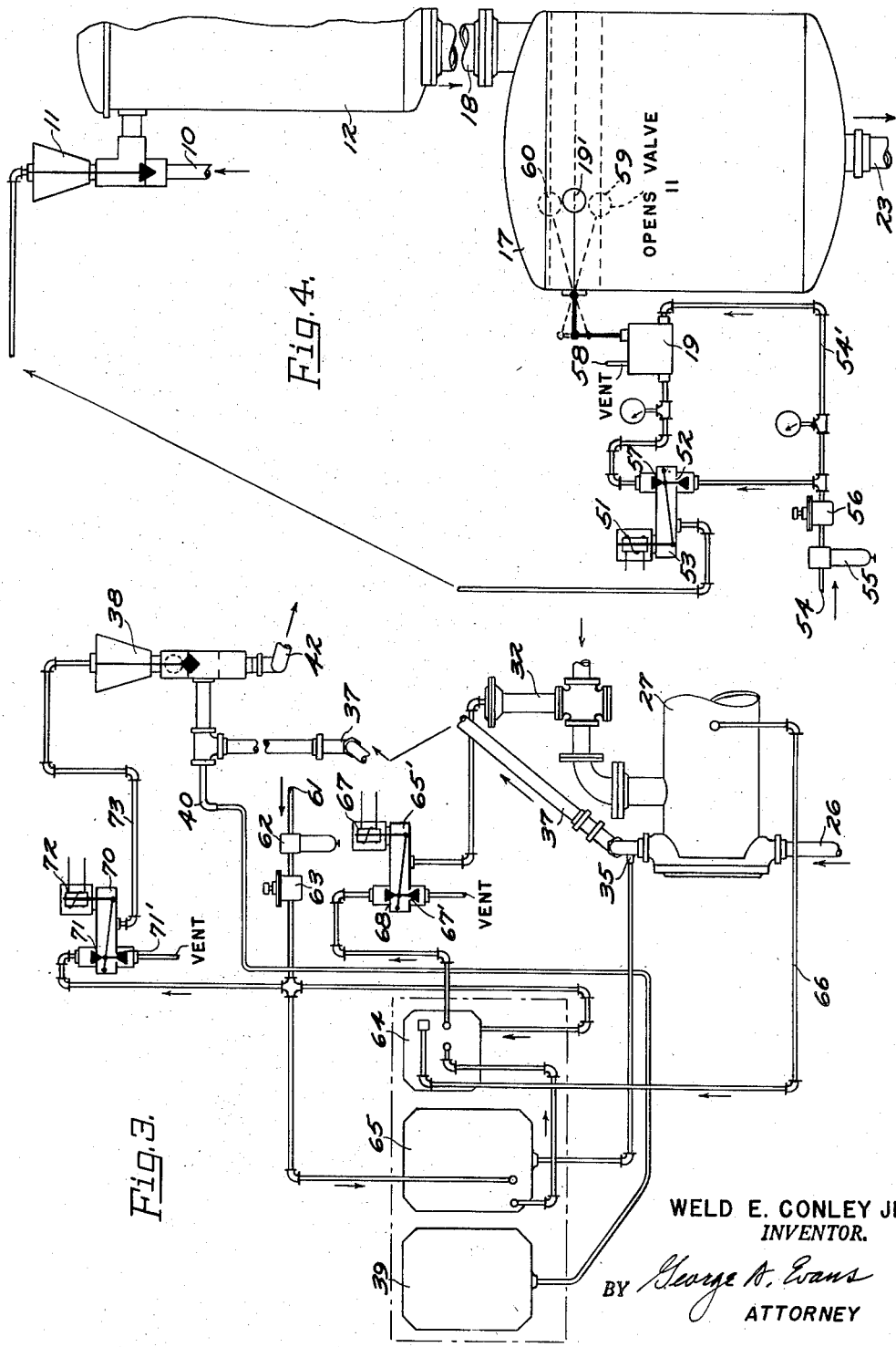

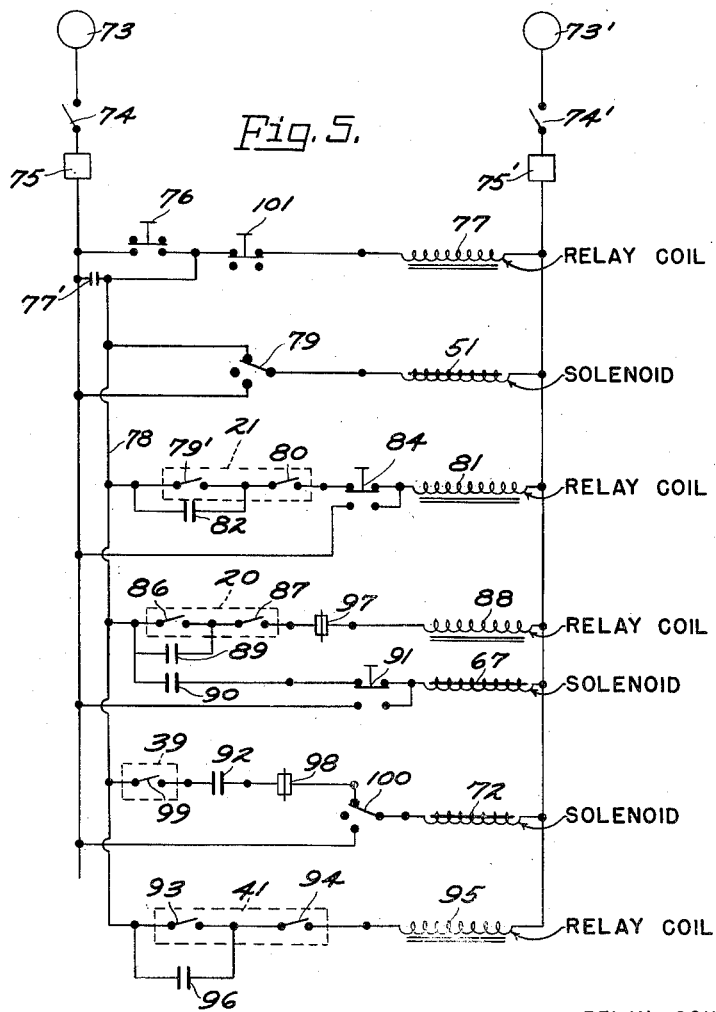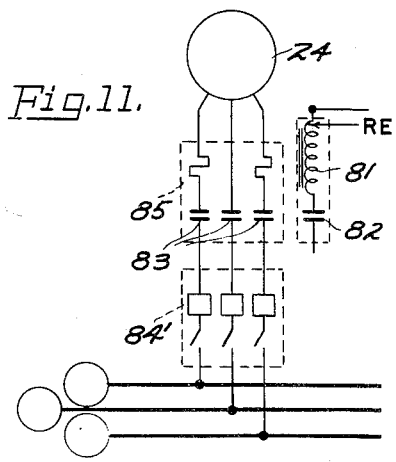

April 17, 1951 W. E. CONLEY, JR 2,549,575
APPARATUS FOR THE CONTINUOUS TREATMENT OF
LIQUIFORM COMESTIBLES
Filed June 12, 1947 5 Sheets-Sheet 5
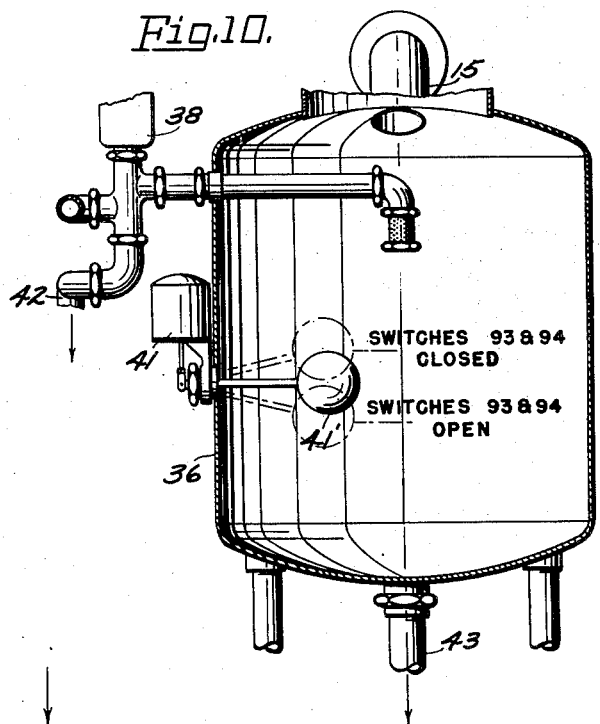
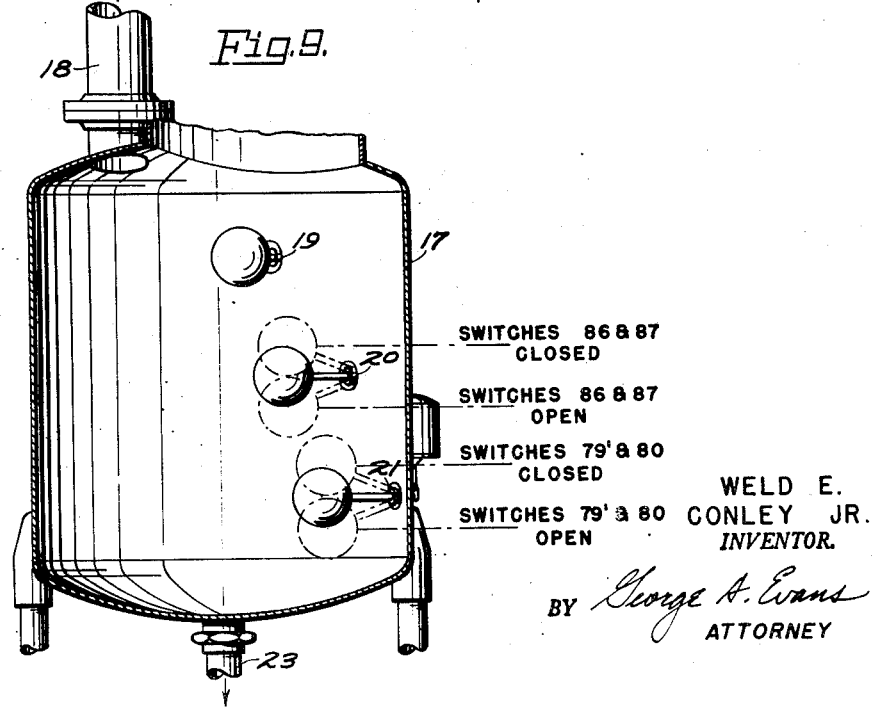
WELD E. CONLEY JR.
INVENTOR.
BY George A. Evans
ATTORNEY Patented Apr. 17, 1951

2,549,575

UNITED STATES PATENT OFFICE 2,549,575

APPARATUS FOR THE CONTINUOUS TREATMENT OF LIQUIFORM COMESTIBLES

Weld E. Conley, Jr., Wauwatosa, Wis., assignor to Chain Belt Company, Milwaukee, Wis., a corporation of Wisconsin Application June 12, 1947, Serial No. 754,096

2 Claims. (Cl. 99—252)

This invention relates to the treatment of flowable comestibles and in particular to the continuous sterilization and deaeration of such comestibles as tomato, fruit, citrus, and similar juices. The teachings of this invention can also be successfully applied to the treatment of dairy products and the like.

Various processes for the continuous heat treatment of flowable comestibles have been used in the past without too much success. As a result, today most of the food processing industries use batch processes, and the comestible receives its final treatment after it has been sealed in cans. This mode of treatment necessarily involves considerable mechanical equipment to handle the cans while they are being sterilized and cooled. Further, the sterilization of the comestible in the can requires a considerable amount of time, and, since the final flavors and vitamin value of the comestibles are controlled, by and large, by the time and temperature used during processing, the present-day canned comestibles are not without defects in flavor and vitamin value. The treatment aforesaid also has defects in the retarded inactivation of organic catalysts such as enzymes which act upon the comestible, destroying its natural quality of flavor, body, and vitamin content. These are some of the reasons that canned foods are not in anywise comparable to the natural products themselves.

The use of the instant invention reduces the amount of time needed to heat treat the comestibles; also it combines the steps of heat treatment and deaeration in a continuous process. The use of divers complex mechanical applications usually necessary is entirely eliminated. In this manner the invention provides a more natural canned food product while reducing the amount of handling usually necessary, with consequent economies.

It is the object of this invention to provide a process for the continuous, rapid treatment of liquiform comestibles in which the comestibles' heat treatment is completed prior to filling.

Another object of this invention is to combine the sterilization and deaeration steps in a rapid, continuous process for flowable comestibles. Thus, in accordance with the present invention, a process is provided to continuously subject the incoming liquiform comestibles to direct contact with heated vapors derived from a subsequent evaporative cooling of the comestible, thereby heating the comestible, and subsequently evaporatively cooling the comestible and returning the vapors evolved to heat the incoming comestible.

It is also the object of this invention to provide apparatus for the carrying out of the above mentioned process.

Another object of the invention is to provide apparatus for said process which is capable of being easily cleaned.

Still another object of the invention is to provide apparatus for the carrying out of the process aforesaid which is adapted to simple operation.

A further object of this invention is to provide apparatus for carrying out the process aforesaid which is capable of economical operation.

These and other objects will appear in the examination of the following drawings and in the reading of the following description and claims.

In the figures:

Fig. 1 is a general view of the entire apparatus suitable for practicing the invention.

Fig. 2 is a view of part of the apparatus used in the invention showing a modification wherein a steam jet pump is embodied.

Fig. 3 is a diagrammatic drawing of the various air controls shown in Fig. 1.

Fig. 4 is another diagrammatic drawing of the air controls shown in Fig. 1.

Fig. 5 is a schematic drawing of the electrical controls used with the apparatus.

Fig. 6 is a diagrammatic drawing of the controls for the direct contact heat exchanger shown in Fig. 1.

Fig. 7 is a diagrammatic drawing for the controls of the indirect contact heat exchanger shown in Fig. 1.

Fig. 8 is a diagrammatic drawing of the controls for the evaporative cooler shown in Fig. 1.

Fig. 9 is a broken away view of the holding vessel 17 showing the location of the floats therein.

Fig. 10 is a broken away view of the evaporative cooler 36 showing the arrangement of the inlet nozzle, vent, and float.

Fig. 11 is a schematic wiring diagram for the product pump 24.

Referring to Fig. 1, the comestible is shown as entering the apparatus through the inlet pipe 10. The temperature of the incoming comestible will vary depending on the type of comestible being treated and also whether or not it may have been heated or otherwise treated in prior steps. In the case of citrus juice, the extracted juice is usually strained and may then be pumped and piped into the inlet 10. With many juices, the comestible entering at 10 may very well carry a portion of divided solids; so long as it is flowable and the solids are not too large, the juice is adapted to processing by this invention. The valve 11 controls the flow of the comestible into the direct contact heat exchanger 12 where it passes through a nozzle 13 surrounded by a downwardly diverging cone-shaped baffle 14 arranged to effect a downward spray of the comestible as shown in Fig. 1. Hot vapors evolved during the subsequent evaporative cooling of said comestible are introduced into the chamber 12 by means of a duct 15 shown as entering the chamber 12 near the lower end thereof. The incoming comestible directly contacts these vapors, condensing them and thereby raising the temperature of the comestible. In this manner volatile constituents rich in flavor and aroma are retained. The noncondensable vapors, such as air, pass the baffle means 14 and are vented to the atmosphere through the duct 16.

The preheated comestible leaving the tank 12 flows into a holding tank or vessel 17 through the duct means 16. There are three float control means in the tank 17 which are designated 19, 20, and 21. These will be more clearly described in subsequent references to the controls. A thermometer 22 is positioned in the tank to enable ready reading of the temperature of the comestible in said tank. The outlet of said tank 23 is positioned at the bottom thereof and is shown communicating with a positive displacement pump 24 which is arranged to withdraw the comestible at a rate substantially commensurate with its average flow into the chamber 12. Also, the pump appreciably increases the pressure of the comestible, in some cases up to a pressure as high as 75 p. s. i., so that it can be moved at a high velocity through the following high temperature heat exchanger. A drain 25 for the outlet of said tank is provided in the line 23 as shown in Fig. 1. The pump 24 is connected by means of piping 26 to the indirect heat exchanger 27. This heat exchanger as shown in Fig. 1 is a shell and tube type heat exchanger, although other equivalent means may be provided. The heat exchanger 27 in the instant embodiment is employed to pass the preheated comestible therethrough at a high velocity which is attained by reducing the cross section of the tubes through which the juice passes, this cross sectional reduction may be increased as the juice progresses. The heated medium for said exchanger is super-atmospheric steam which enters at 28, passes through a strainer 29, valve 30, a pressure reducer 31, and a valve 30'. Modulating valve 32 is controlled by preset automatic controls responsive to variations in temperature of the outgoing comestible, the detailed arrangement of which will be subsequently described. The condensate from said indirect contact heat exchanger leaves through the outlet 33. A thermometer 34 is provided at the comestible outlet for visually determining the outlet temperature of the heated comestible. Also, a temperature bulb 35 is inserted at this point, being further connected to automatic controls to regulate the temperature of the outgoing comestible.

The comestible leaving the heat exchanger is directed to the evaporative cooler 36 by means of piping 37. The flow of the heated, high pressure comestible to the evaporative cooler is controlled by a three-way valve 38. This valve is controlled by an automatic temperature control 39 responsive to the temperature bulb 40 and the float switch 41, so that the comestible, when insufficiently heated, is by-passed to the holding tank 17 by means of the piping 42. Also, the hot vapors evolved during the evaporative cooling are permitted to flow from the evaporative cooling vessel through the piping 15 as aforesaid. The comestible cooled by the flashing off of vapors is drawn off from the bottom of the tank by means of piping 43. It may be here noted that the comestible leaving the chamber 36 is also substantially deaerated, as the release of pressure in said chamber coupled with the rapid evolution of volatiles releases most of the entrained and dissolved air from the comestible. Further, the concentration of the condensable volatiles in the cooled comestible is substantially equal to that of the untreated juice, for the condensable volatiles flashing off in said cooler are returned to the flow of the incoming comestible thereby increasing or fortifying the concentration of said volatiles in the comestible held in the tank 17. Hence, after the evaporative cooling step, it follows that a natural amount of condensable volatiles remains in the final product.

As a final step, the treated comestible is withdrawn from the chamber 36 and transferred through the pipe 43 to filling machines (not shown) whence it is filled and sealed into cans. The final product temperature is slightly below the boiling point of the comestible in the evaporative cooler 36 due to heat losses in the pipe 43 and in the filler. If the pressure in the chamber 36 is maintained at or below atmospheric pressure, it follows that filling of the comestible into containers is not a great problem because of boiling or foaming. The pressure in the chamber 36 may be maintained sufficiently high, however, so that the final product after filling and sealing is at a temperature to inactivate any bacteria which may have entered the can during the filling operation, if aseptic filling means were not used. This is simply done by inverting the can so that the still hot comestible contacts the cover of the can. The cans next require the only further treatment of cooling prior to labeling, packaging, and storing.

Variations of the apparatus are possible, such as combining both vessels 12 and 17 into one chamber. The holding tank 17 and the other portions of the apparatus are constructed so as to be easily cleaned when the line is not in operation, as this is a desired sanitary requisite for all food processing equipment.

The apparatus illustrated herein will process a comestible having a temperature at the inlet 10 of 160° F., so that its temperature after direct contact with the hot vapors in the chamber 12 may rise to as much as 205° F. Further, the temperature of the comestible shown leaving the indirect contact heat exchanger 27 may be raised to about 260° F. which is ordinarily sufficient to inactivate any bacteria present in the juice. After evaporative cooling the final product temperature may be about 210–212° F. The conditions aforesaid will prevail when the vent 16 is opened to and communicating with the atmosphere.

In the modification shown in Fig. 2 the vent 16 is in communication with a steam jet pump 45 which will reduce the pressure in the system. Attached to said jet pump are the steam lines 46' and 47. The amount of pressure in the system is controlled by a spring loaded valve 48 which permits atmospheric air to enter the jacket of the pump 45 when the pressure therein falls below a predetermined value. A vacuum gauge 45' is shown connected to the duct 15 to ascertain the pressure existing in the system.

The use of the steam jet 45 permits the comestible to be cooled in chamber 36 to a lower temperature, which is desirable in processing certain citrus juices such as orange juice where a pressure of 19 inches Hg. absolute will produce a temperature in the holding tank 17 of approximately 190° F. For processing orange juice the indirect heat exchanger 27 may be adjusted so that the outlet temperature thereof will be approximately 220° F. Higher temperatures are generally detrimental to the flavor of citrus juices. The comestible will evaporatively cool in the vessel 36 to approximately 190° F. before it is withdrawn, and the juice entering the heat exchanger 27 will be preheated from approximately 130° F. to 160° F. by contact with the vapors from the cooler.

The functions and operation of the air operated controls are shown in Figs. 3, 4, 6, 7, and 8. In Fig. 4 the product is shown as flowing through the valve 11 by means of the piping 10. The valve 11 is there shown in the closed position; this is by reason of the fact that solenoid 51 is de-energized, permitting air to flow through the valve opening 52, through the valve 53 to the valve 11 which is constructed so as to be normally held in an open position by means of springs; an air operated diaphragm is provided to close the valve 11 under the influence of air pressure. The air for this control is provided from any suitable source at 54, passes through a filter 55, a reducing valve 56, and then to the valve port 52.

The comestible flows into the chamber 12 when the solenoid 51 is energized which action permits air to pass through the valve port 57 and vent through the opening 58 of pilot valve 19. The pilot valve 19 is also connected to the source of air supply through the line 54', and when the float 19' is in a low position 59, the vent 58 is open as aforesaid. When, however, the float 19' is in the high position 60, air passes from the line 54' through the valve 19, thence through port 57 and acts upon the diaphragm of the valve 11 to close it, shutting off the flow of comestible into the chamber 12. Thus a predetermined maximum level of comestible is maintained in the tank 17.

Fig. 3 is a diagrammatic drawing showing the operation of the controls for the evaporative cooler 36, the by-pass 42 therefor, and the indirect heat exchanger 27. The steam valve 32 is of a type which is held closed by means of springs and is opened by the influence of air pressure on a diaphragm as shown in Fig. 7. Therefore, when the air supply is cut off, the valve closes. The air supply from any suitable source is shown at 61 passing through a filter 62 and a reducing valve 63; it is further shown as being connected to an indicating pressure controller 64 and a temperature controller 65. These two units, which are conventional and need not be described in detail, are arranged to operate in series as hereinafter described so that while a constant temperature of the comestible leaving the indirect heat exchanger 27 is maintained, the pressure in said exchanger will never become excessive.

The instrument bulb 35 is inserted in the outlet of the indirect heat exchanger 27 and leads to the temperature controller 65 which throttles the flow of air when the temperature at the outlet exceeds a predetermined value and vice versa. The throttled supply of air thereupon passes to the indicating pressure controller 64 which permits the air to flow to the valve 65' if the pressure of the steam in the shell of the indirect heat exchanger 27 is not excessive. Pressure in the heat exchanger is transmitted to the pressure regulator 64 by the pressure line 66 for this purpose. In Fig. 3 the solenoid 67 is shown as being de-energized; as can be appreciated from the foregoing the air influencing the movement of the diaphragm of the valve 32 flows out through valve 65' and port 67', whereupon the valve 32 is closed by its springs. Air coming from the indicating pressure controller 64 is permitted to flow through port 68 of valve 65 to the diaphragm of valve 32 when the solenoid 67 is energized, the control of which will be subsequently described. This action opens the valve, and as the amount of air is modulated by the controls, responsive to the outlet temperature of the comestible and the pressure within the heat exchanger, it will be thusly appreciated how a constant predetermined outlet temperature of the comestible is obtained.

The three-way valve 38 shown in Figs. 3 and 8 is a type which normally provides a passage for the partially heated comestible flowing through piping 37 from the indirect heat exchanger 27 to the holding tank 17 by means of piping 42. This is by reason of the structure of the valve which is urged in this position by means of springs. A diaphragm member responsive to air pressure urges the valve into a position permitting the flow of the comestible into the evaporative cooler 36. The air for this purpose is obtained from any suitable source as at 61 and is directed to the valve 70 through port 71. As shown in Figs. 3 and 8, the solenoid 72 is in a de-energized position which position permits the air acting upon the diaphragm of the valve 38 to pass through valve 70 by means of piping 73 and vent through port 71'. The safety thermal limit recorder 39 is responsive to a temperature bulb 40 placed in the product line 37 which leads from the indirect heat exchanger. If the temperature of the comestible has not attained a predetermined value, the thermal safety limit recorder 39 does not function to energize the solenoid 72, whereupon the comestible is by-passed through piping 42 to holding tank 17 and continues through the pump 24 and heat exchanger 27 until the predetermined value of temperature is reached. At this point the instrument 39 is responsive to the bulb 40; the solenoid 72 is energized, air operates the valve 38 to cause the comestible to flow into the evaporative cooler 36.

A schematic wiring diagram of the electrical control circuit is shown in Fig. 5. The current supply for the control circuit is 110 volts, 60 cycle current from any suitable source shown at 73 and 73'. There are switches 74 and 74' and fuses 75 and 75' serving as the conventional controls and safeguards.

Assuming that the comestible is under pressure in the piping 10 but is blocked by the closed valve 11, the control system functions accordingly: the switches 74 and 74' are thrown whereupon the push button switch 76 is caused to make contact thus energizing the relay coil 77 which closes the relay contact 77' thus energizing the left side of the control line 78. The manually operated three-way push button switch 79 causes the solenoid 51 to be energized when it is closed whereupon the float control valve 19 controls the flow of the comestible into the chamber 12 as has been described.

The lower float 21 in the holding or surge tank 17 has two switches; 79' arranged to close on the near high level of comestible in the tank, and 80 arranged to open on the near low level of the comestible in the tank. The switch 79' will also open on the low level in the tank; likewise the switch 80 will close on the high level in the holding tank 17. Hence, when the high level of comestible in holding tank 17 is reached, both switches 79' and 80 are closed. This energizes the relay coil 81 in the electrical starter 85 of the product pump 24, closing the relay contact 82 and also the line contacts 83, thus starting the product pump 24 in operation as shown in Figs. 5 and 11. The arrangement of the switches controlled by float 21, provides a range near the maximum and minimum limits of the float in which both switches are either closed or open as the case may be. The push button switch 84 is normally closed; however, it is arranged so that the product pump control can be operated manually should such operation be desired.

In Fig. 11 the product pump is shown connected to a source of 220 volts, 3 phase, 60 cycle current. A conventional hand operated switch 84' is provided ahead of the electrical starter 85.

Referring again to Fig. 5 it will be noted that the middle float 20 in the holding or surge tank 17 is arranged to operate two switches; 86 which closes on the near high level of comestible in said tank and 87 which opens on the near low level of comestible in holding or surge tank 17. The switch 86 is also arranged to open on the low level in said tank, and the switch 87 is also arranged to close on the high level of comestible in said tank. Thus when an operative level of comestible is in tank 17, both switches are closed, and the relay coil 88 is energized, closing the relay contacts 89, 90, and 92; whereupon solenoid 67 is energized, permitting the steam valve 32 to open. The arrangement of the switches controlled by float 20 also provides a range near the maximum and minimum limits of the float in which both switches are either closed or open. It can now be appreciated that the indirect heat exchanger will not be heated until there is sufficient product to pass therethrough without scorching; this is true in the initial operation of the system or in the event of a breakdown during continuous operation. The push button switch 91 is provided so that manual control of the steam valve 32 may be had if desired.

The float control 41 in the evaporative cooler 36 has two switches 93 and 94 incorporated therein. The switch 93 is arranged to close on the near high level of comestible in said vessel, and the switch 94 is arranged to open on the near low level. Conversely, the switch 93 opens on the low level, and the switch 94 closes on the high level. Therefore, assuming that the high level of comestible in the evaporative cooler 36 is reached, in the instance where the subsequent filling operation has ceased, the level of the comestible will rise and both switches will be closed. Thereupon the relay coil 95 is energized which closes the relay contacts 96; this action further opens the relay contacts 97 and 98 whereupon the solenoid 67 is de-energized, and the steam to the indirect heat exchanger is shut off. Also, the comestible is by-passed through the valve 38 to the holding or surge vessel 17. The above action continues until the level of comestible in the evaporative cooler 36 falls, when it reaches a predetermined low level, the switches 93 and 94 are opened; whereupon the switch 94 causes the relay coil 95 to be de-energized. This action permits the relay contacts 97 and 98 to close and the contact 96 to open. The comestible is then heated but continues to be by-passed until it has reached a predetermined temperature value. Thereupon the safety thermal limit recorder 39 which is responsive to temperature bulb 40 closes the switch 99, and the solenoid 72 is energized; whereupon the comestible is sprayed into the evaporative cooler as aforesaid. The arrangement of the switches controlled by float 41' further provides a range near the maximum and minimum limits of the float in which both switches are either closed or open as the case may be. A three-way push button switch 100 is provided to operate the solenoid manually, automaticaly as stated, or to shut it off. The entire automatic control circuit is shut off by means of push button switch 101.

One of the present practices in the treatment of such juices as those derived from citrus fruits is to deaerate the unsterilized juice prior to filling. This procedure is carried out by conventional deaerating equipment. It has been found that after deaeration, a material amount of volatile constituents of the juice, such as peel oil which makes for increased flavor of the juice, has been lost due to the volatilization during the deaeration step. In order to bring the juice up to flavor standards, the constituents must be again introduced into the juice by some other means. This procedure is not satisfactory in that it increases the processing steps, and it is difficult to inject the correct amount of peel oil to bring the processed juice up to natural values. A study of the instant invention readily leads one to understand that the loss of flavorsome constituents is entirely avoided. For the volatiles are condensed by the incoming comestible in the direct contact heat exchanger 12. Further, the amount of peel oil in the final sterilized and deaerated product is the correct natural amount corresponding with that in the freshly extracted juice. The foregoing holds as well for the processing of other liquiform comestibles; there is no boiling away of flavor possible during the processing of comestibles. Further, since some vitamins such as vitamin "A" are oily liquids, it is possible to lose portions of the vitamin content of comestibles through steam distillation when batch processes are used; portions of the vitamin "A" will simply boil off. However, in the practice of this invention it is apparent that such a loss is not possible.

The operation of the apparatus shown is very economical and efficient. For by utilizing the latent heat of vaporization given up during the evaporative cooling step to heat the incoming comestible, economies in steam and equipment are effected. These economies are not present in methods used today, for the such continuous heat treatment and deaeration of comestibles is not possible with other types of treating equipment. The advantages over batch methods are also obvious. Further, the apparatus shown is capable of being readily cleaned after the system has been in operation. All that is necessary is to introduce water or a detergent solution into the system and circulate it as the comestible is circulated during treatment. This action flushes out any remaining comestible and leaves the system entirely clean when the solution is withdrawn.

The invention can be practiced with divers comestibles, and the apparatus shown and described is capable of various modifications in form, also in values of heat, pressures and velocities used; hence, it is to be limited only by the clear import of the following claims:

1. Apparatus for the continuous sterilization of flowable comestibles containing a vaporizable constituent which comprises a tall vertical receiving and vapor-liquid exchange column, liquid-spray distributing means in the upper portion of said column for spraying the comestible thereinto, a liquid-holding vessel connected with the lower end of said column and into which the comestible discharges and in which it collects, a heat-exchanger arranged for the passage therethrough of said comestible in indirect heat-exchange with a heating medium, means for moving said comestible from the holding vessel into and through said heat-exchanger, a vapor-releasing vessel into which the heated comestible is discharged from the heat-exchanger with concomitant liberation of vapor of the vaporizable substance therefrom, and means for conducting the vapor thus formed into said vertical vapor-liquid exchange column in interceptive relationship with the spray of incoming comestible.

2. The apparatus as defined in claim 1, in which a by-pass is arranged for conducting the heated comestible from the heat-exchanger back into the holding vessel.

WELD E. CONLEY, Jr.

REFERENCES CITED

The following references are of record in the file of this patent:

UNITED STATES PATENTS

| Number | Name | Date |
|---|---|---|
| 960,417 | Schwanhausser | June 7, 1916 |
| 1,484,296 | Butaud | Feb. 19, 1924 |
| 1,541,994 | Nielsen | June 16, 1925 |
| 2,064,808 | Beran | Dec. 22, 1936 |
| 2,122,954 | Rogers | July 5, 1938 |
| 2,392,197 | Smith et al. | Jan. 1, 1946 |
| 2,401,077 | Johnson | May 28, 1946 |
| 2,498,836 | Cross | Feb. 28, 1950 |

FOREIGN PATENTS

| Number | Country | Date |
|---|---|---|
| 587,459 | France | Oct. 16, 1924 |